Oct. 6, 1942.  F. J. WESTROPE  2,297,820
FOLDABLE TOP STRUCTURE FOR MOTOR VEHICLES
Filed Nov. 16, 1940   3 Sheets-Sheet 1

Inventor
Frederick J. Westrope
By
Attorneys

Oct. 6, 1942.　　　　F. J. WESTROPE　　　　2,297,820
FOLDABLE TOP STRUCTURE FOR MOTOR VEHICLES
Filed Nov. 16, 1940　　　3 Sheets-Sheet 2

Inventor
Frederick J. Westrope
By
Attorneys

Oct. 6, 1942.  F. J. WESTROPE  2,297,820
FOLDABLE TOP STRUCTURE FOR MOTOR VEHICLES
Filed Nov. 16, 1940  3 Sheets-Sheet 3
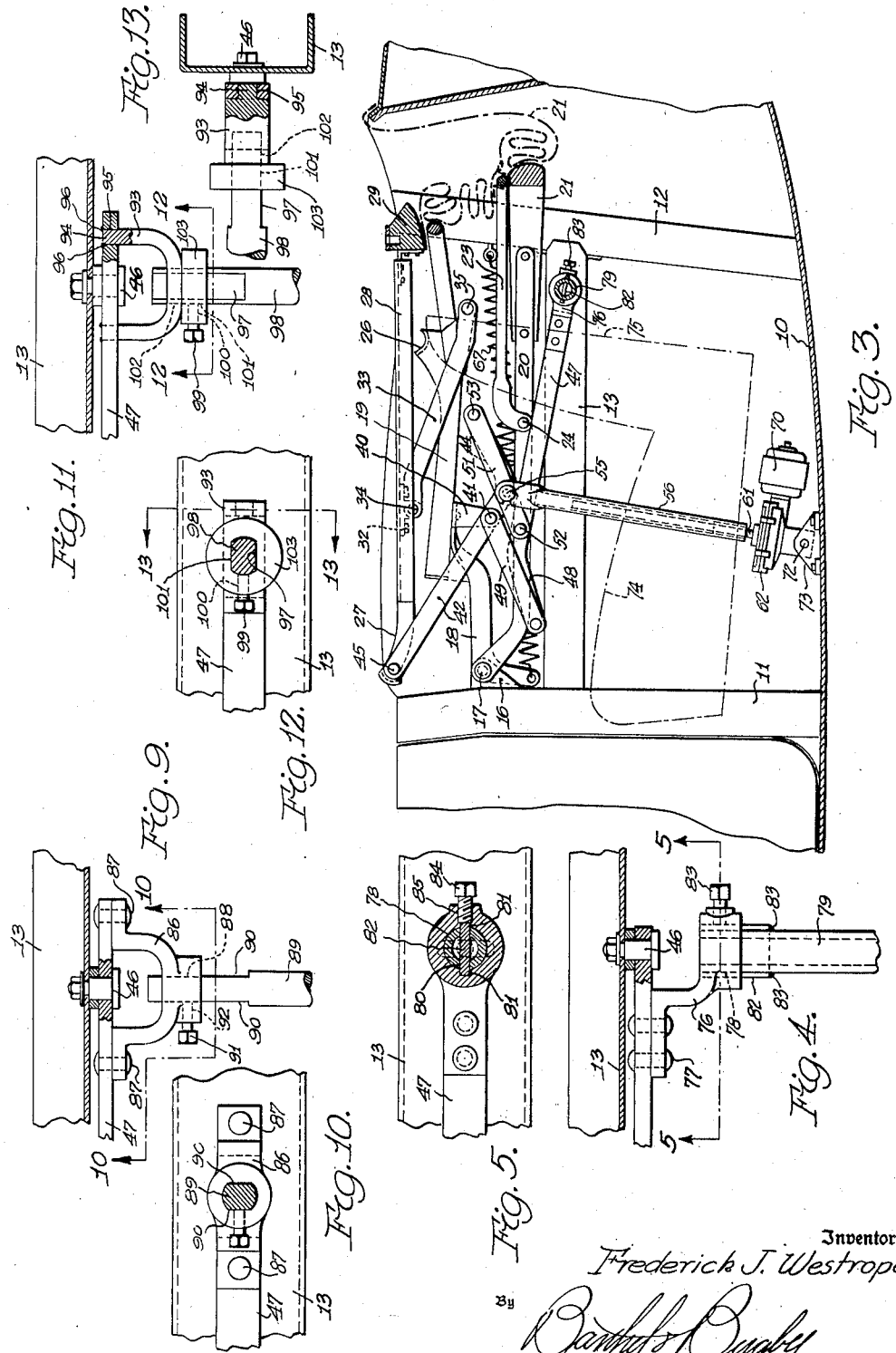
Inventor
Frederick J. Westrope
By
Barthel & Bugbee
Attorneys Patented Oct. 6, 1942

2,297,820

UNITED STATES PATENT OFFICE 2,297,820

FOLDABLE TOP STRUCTURE FOR MOTOR VEHICLES

Frederick J. Westrope, Pleasant Ridge, Mich., assignor, by mesne assignments, to Reconstruction Finance Corporation, Detroit, Mich., a corporation of the United States Application November 16, 1940, Serial No. 365,877

8 Claims. (Cl. 296—112)

This invention relates to motor vehicles and in particular to foldable top structures including operating mechanism therefor.

One object of the present invention is to provide a foldable top structure having raising and lowering mechanism disposed at spaced locations with interconnecting mechanism between them and a common source of driving power so that the top members are raised and lowered in exact synchronization, thereby avoiding the racking, jamming and excessive wear resulting from a lack of synchronization when separate sources of driving power are utilized.

Another object is to provide a foldable top structure having raising and lowering mechanism on opposite sides of the car body with interconnecting mechanism and a common driving motor disposed on one side thereof, thereby synchronizing the raising and lowering of the top members and enabling the driving motor to be located in vacant space not interfering with the passenger space.

Another object is to provide a foldable top structure as set forth in the preceding objects wherein the top members swing around main pivots on opposite sides of the body which are interconnected by mechanism which synchronizes the raising and lowering, this mechanism being disposed behind the seat and extending across the body.

Another object is to provide a foldable top structure as set forth in the preceding objects wherein the interconnecting mechanism consists of a shaft interconnecting the pivots on the opposite sides of the body, preferably mounted in brackets which align the shaft with the main pivots of the top members.

In the drawings:

Figure 3 is a view of a portion of the structure shown in Figure 1, but with the top members in their lowered positions.

Figure 4 is a top plan view of one end of the cross shaft interconnecting the main pivots of the foldable top showing the bracket construction.

Figure 5 is a vertical section along the line 5—5 in Figure 4.

Figure 6 is a vertical longitudinal section through one of the raising and lowering screws and the associated driven nut taken along the line 6—6 in Figure 1.

Figure 7 is a cross section along the line 7—7 in Figure 6 showing the manner of anchoring the nut.

Figure 8 is a horizontal section along the line 8—8 in Figure 1 showing the driving motor and reduction gearing.

Figure 9 is a top plan view similar to Figure 4 but showing a modification of the cross shaft and bracket.

Figure 10 is a vertical section along the line 10—10 in Figure 9.

Figure 11 is a view similar to Figures 4 and 9 but showing a further modification of the cross shaft and bracket therefor.

Figure 12 is a vertical section along the line 12—12 in Figure 11.

Figure 13 is a vertical section along the line 13—13 in Figure 12 taken at right angles thereto.

General arrangement

Figure 1:
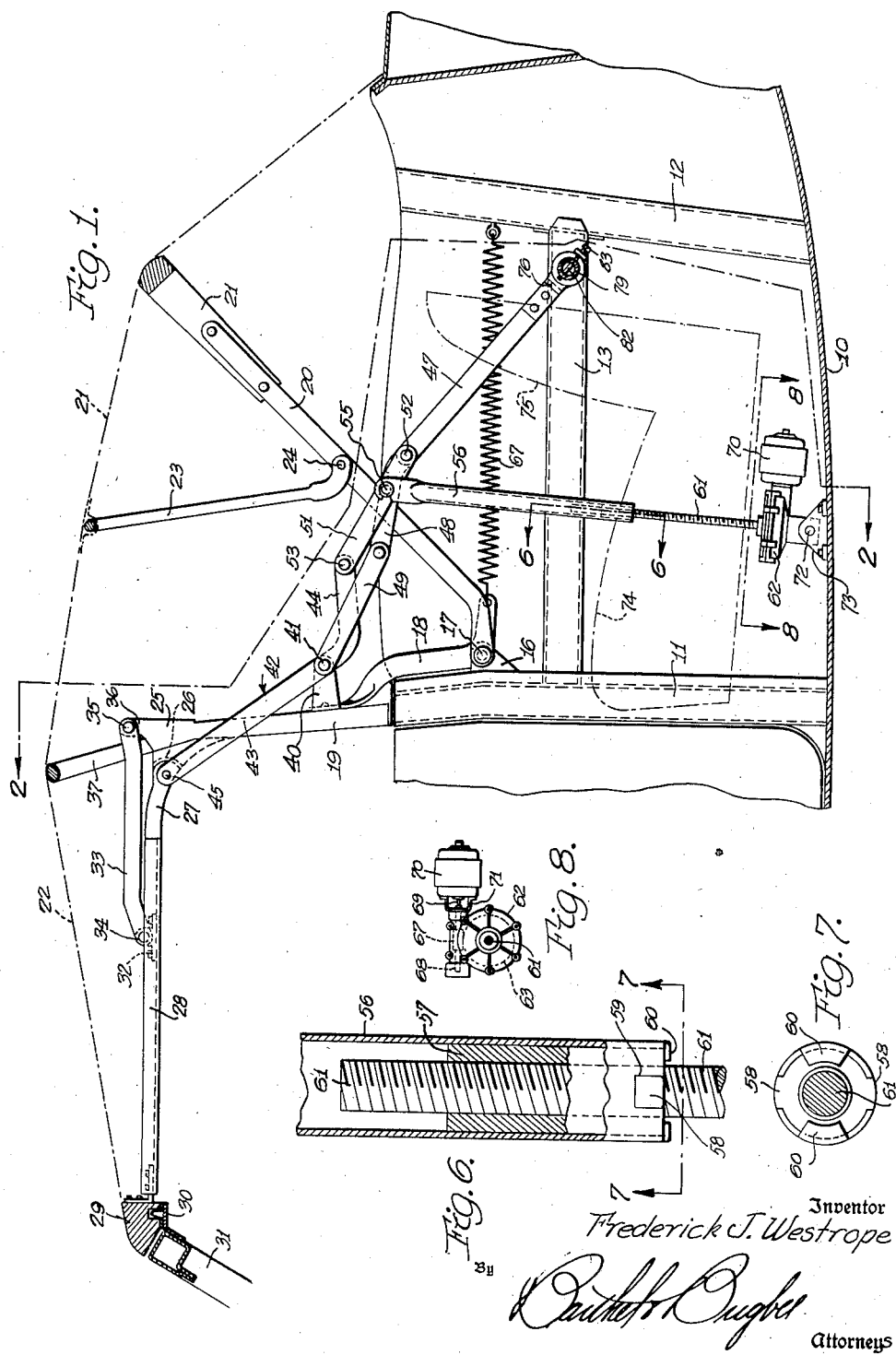
Figure 1 is a fragmentary longitudinal sectional view of the rear portion of a motor vehicle body showing one side of the foldable top structure with the parts in raised position.

In general, the foldable top structure of the present invention consists of pivoted top members, the main pivots of which are located on opposite sides of the body. On one side of the body is mounted a motor having an operative connection with the top members so as to raise and lower one side thereof. In order that the other side shall be raised and lowered in synchronism with the first-mentioned side, the main top members are interconnected at the main pivots by a cross shaft extending across the body behind the seat. This cross shaft is connected by special brackets to these top members so that the axis of the shaft is accurately aligned with the axis of the main pivots.

As a consequence, when power is applied by the motor to one side of the top structure, this power is transmitted though the cross shaft to the other side, so that the latter is raised or lowered in synchronism with the former. In this manner the top members on opposite sides of the car remain in synchronism without the necessity of providing separate, carefully synchronized motors on opposite sides of the car. At the same time, the moving parts are out of the way of the passengers and no part of the useful passenger space is obstructed.

Hitherto, in automatically foldable top structures, separate motors have frequently been employed on opposite sides of the car body for raising and lowering the opposite sides simultaneously. Under these circumstances, it is very difficult to cause the raising and lowering to take place on opposite sides in synchronism. One motor may get started slightly sooner than the other motor or may operate more slowly, with the result that one side of the top structure moves up ahead of the other side and the parts tend to bind or jam. When the parts are thus pushed out of line by this lack of synchronism, the resulting strain also causes an excessive wear upon the pivots.

It has also been proposed to use a single motor mounted immediately behind the front seat in the middle thereof, with shafts running to the opposite sides of the car to the raising and lowering mechanism located at these opposite sides. This installation, however, is directly in the way of the feet of the passengers and also must be raised high enough to clear the propeller shaft tunnel of the car. The latter is a rather necessary evil in passenger cars, but is unavoidable where a front engine is used to drive a rear axle if the car is to be low. The top raising mechanism which goes over the top of the shaft tunnel is so far above the former that it is unsightly and very much in the way.

In the foldable top structure of the present invention, however, the interconnection of the opposite sides of the top structure by the cross shaft extending between the main pivots and behind the seat solves these practical difficulties. The cross shaft passes across a space which is entirely outside the passenger compartment and is wholly concealed from view when the seats are in their normal positions. The motor can still be mounted on the floor on one side of the car and the other side of the top structure raised or lowered accurately in synchronism by means of the cross shaft. By thus using a single motor, the expense of the installation is also reduced and the compactness of the arrangement greatly enhanced.

Construction

Figure 2:
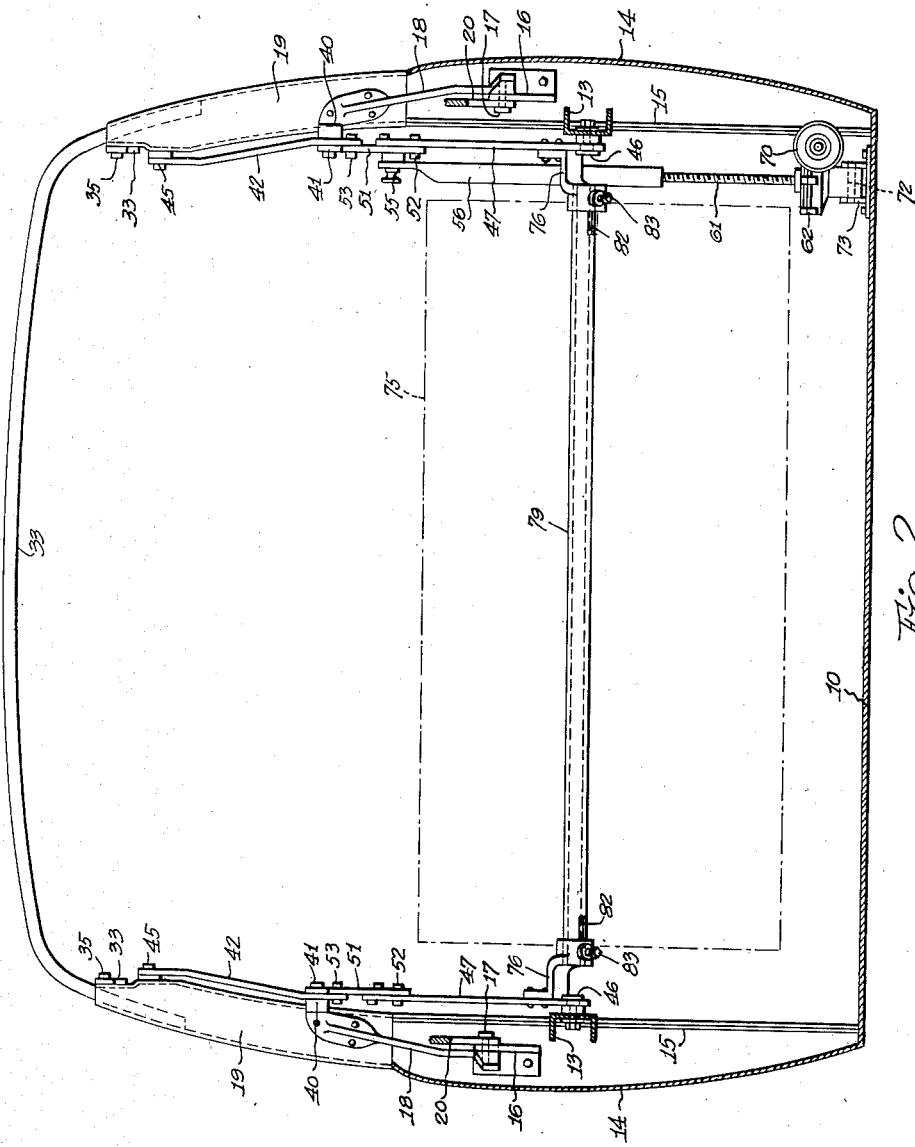
Figure 2 is a transverse section along the broken line 2—2 in Figure 1 showing the interconnecting shaft for synchronizing the raising and lowering of the top members from a single driving motor.

Referring to the drawings in detail, Figure 1 shows a motor vehicle body with a floor 10, intermediate body pillars 11, and rear pillars 12. These intermediate and rear pillars 11 and 12 are preferably joined together and reinforced by longitudinal frame members 13 which are rigidly secured to the pillars 11 and 12 at locations intermediate their upper and lower ends. The pillars 11 and 12, together with the front pillars (not shown) are enclosed by the usual external body panels 14 and internal panels 15 (Figure 2).

Rigidly secured to each of the intermediate pillars 11 is a rearwardly extending bracket 16 to each of which a lever 18 is pivoted by a pin 17, the levers 18 each carrying an extension member 19 which in the raised position of the top extend upwardly respectively from the intermediate pillars 11. Also pivoted to each of the brackets 16 there is a rearwardly extending top frame member 20, which members are connected together by a rear cross bow 21 to which the top covering, as at 22, is tacked or attached in any suitable manner. An intermediate bow 23 is carried by and pivoted to the frame members 20 to which bow the top covering 22 is also attached, and in the raised position of the top, as shown in Figure 1, the bow 23 extends upwardly and slightly forwardly from its pivot connections with the frame members 20, the bow 23 being pivoted to the members 20 by pins 24 or by other suitable means.

Each of the pillar extension members 19 is provided with an extended portion 25 adjacent the upper end thereof, which portions are provided with sockets 26 which, in the raised position of the top, face forwardly and respectively receive end bearing portions 27 of longitudinally extending, side frame members 28. The frame members 28 are rigidly secured together at their forward ends by a cross member 29 which, in the raised position of the top, seats on and is rigidly secured to a bracket 30 which is rigidly secured to the windshield header member 31, the means for rigidly securing the top cross member 29 to the bracket 30 being any suitable releasable attaching means. Respectively secured to each of the top frame members 28, intermediate the ends thereof, there is a bracket 32 to which forward ends respectively of link members 33 are pivotally connected, such as by pins 34, the rearwardly disposed ends of the links 33 being pivotally connected by pins 35 respectively to the upper ends 36 of the pillar extension 19, which upper ends 36 project above the sockets 26, as shown in Fig. 1. The pillar extensions 19 carry and are connected together by a cross bow 37 which may be termed the forward bow and to which the top covering 22 is tacked or otherwise suitably attached. The top covering 22 is attached to the forward cross member 29 and, of course, is also attached to the body toward the rear thereof.

Rigidly secured to each of the pillar extensions 19 there is a rearwardly extending bracket 40 and pivoted to each of the brackets 40, such as by pins 41, there is a lever 42, these levers 42 being pivoted intermediate their ends providing, as shown in Fig. 1 or in the raised position of the top, an upwardly extending arm and a lower and rearwardly extending lever arm 44. The upper ends of the lever arms 43 are respectively and pivotally connected, such as by pins 45, to the ends 27 of the frame members 28. Pivoted respectively to each of the body frame members 13, such as by pivot pins 46, there is a lever 47, which levers are provided with forwardly extending bent end portions 48 which are respectively connected by links 49 to the brackets 40, the links 49 being pivotally connected to the ends of the members 47 by suitable pivot pins 41 which connect the levers 42 to the brackets 40. Intermediate the ends of the levers 47, links 51 have their corresponding ends respectively and pivotally connected thereto by pivot pins 52, the other ends of the links 51 being pivotally connected respectively to the corresponding ends of the lever arms 44, such as by pivot pins 53. It will thus be seen that the links 51 respectively interconnect the levers 42 and 47 and that the links 49 respectively interconnect the levers 47 and the pillar extension members 19.

Pivotally connected by a pin 55 to a point intermediate the ends of one of the links 51 is the upper end of a tubular member 56, the lower end of which carries an internally threaded nut 57 (Figures 6 and 7). The latter at its lower end is provided with projections 58 which seat themselves in notches 59 at the lower end of the tubular member 56 so as to drivingly connect the nut 57 to the tubular member 56. Tabs 60 integral with the lower ends of the tubular member 56 are bent over at right angles to the walls thereof so as to retain the projections 58 within the notches 59, thus maintaining the driving connection. Threaded into the nut 57 is a screw shaft 61, the lower end of which enters a casing 62 (Figure 8) and carries a worm gear 63 on the lower end thereof. Meshing with the worm gear 63 is a worm 67 upon a shaft 68 operatively connected to the shaft 69 of the reversible electric motor 70. The latter is secured as at 71 to the casing 62. The casing 62 in turn is pivotally supported upon a pivot pin 72 which in turn is mounted upon the base 73 bolted to the floor 10 or to any other suitable part of the body or frame, according to the circumstances. Thus the motor 70 and casing 62 are located at one side of the vehicle body (Figure 2) in a space out of the passenger space and to one side of and below the rear seat 74 and rear seat back 75.

Secured to each of the levers 47 adjacent the pivot pins 46 (Figures 2 and 4) is an L-shaped bracket 76 bolted, riveted or otherwise secured thereto as at 77. The bracket 76 extends into alignment with the axis of the aligned pivot pins 46 and has a bore 78 coaxial therewith. Mounted in this bore 78 is a tubular cross shaft 79 having a transverse slot 80 in the end thereof aligned with diametrically opposite grooves 81. A key member 82 is inserted in the slots 80 and welded thereto as at 83, engaging the grooves. This assembly is locked in position against endwise movement by means of the set screws 84 threaded into the screw hole 85 (Figure 5). This arrangement permits the cross shaft 79 to be economically constructed and to be easily assembled in the brackets 76.

The modified construction shown in Figures 9 and 10 utilizes a U-shaped bracket 86 secured as at 87 to the top levers 47. Each bracket 86 is provided with a bore 88 aligned with the axes of the pivot pins 46 and adapted to receive the end of the cross shaft 89. Here the latter is of solid construction and is provided with flattened sides 90. The bore 88 is correspondingly shaped so as to prevent relative rotation between the bracket 86 and the shaft 89. A set screw 91 threaded into the screw hole 92 locks the shaft 89 against endwise motion.

The modified construction shown in Figures 11 to 13 also includes a U-shaped bracket 93, the reduced ends 94 of which are inserted in holes 95 in the top levers 47 and welded thereto as at 96. Each end has flattened sides 97 and is inserted in correspondingly-shaped holes 101 and 102 in the collar 103 and bracket 93 respectively, and held in position against endwise displacement by the set screw 99 threaded into the screw hole 100.

Operation

In the operation of the power driven top structure of this invention, the reversible motor 61 is connected to a source of electricity, such as the usual storage battery (not shown), having a reversing switch in the circuit thereof. The operator closes the reversing switch (not shown) in one of its two opposite positions in order to operate the motor 70 in either a forward or reverse direction and raise or lower the top structure by rotating the screw shaft 61. In order to lower the top, the motor 70 is caused to rotate in a direction which rotates the screw shaft 61 in a counter-clockwise direction, causing the nut 57 to move downward along the screw shaft 61, carrying with it the tubular member 56. As the tubular member 56 moves downwardly, the links 49 and 51 are drawn downwardly therewith and also move in a clockwise direction about their respective pivot pins 41, likewise swinging the levers 47 downward around their pivot pins 46. Both levers 47 and their associated levers are caused to move together in synchronism by reason of the cross shaft 79, which transmits the drive from the motor side to the opposite side of the structure.

Since the links 51 are connected by the pivot pins 53 to the levers 42, the latter are pivotally moved in a clockwise direction. At the same time, the levers 18 and extensions 19 carried thereby are swung in a clockwise direction about their respective pivot pins 17. When the extensions 19 swing rearwardly, the sockets 26 disengage from the frame member ends 27 and the frame members 28 pivot about the pivot pins 34 in a counter-clockwise direction.

As the tubular members 59 continue their downward movement, the pivot pin 55 is moved in a clockwise direction around the pivot pin 41 which at the same time is swung also in a clockwise direction around the pivot pin 17. This results in the movement of the pivot pins 55 from the raised position (Figure 1) to the lowered position (Figure 2). With all of the links and levers moving in the above described directions, the rear bow 21 first comes to rest in its lowered position, after which the intermediate bow 23 carried thereby swings down against the rear bow. The link and lever structure carried by the extension members 19 then swings about the various pivots until the lowered position of the top structure (Figure 2) is reached. During the lowering operation, as the links and levers shift their positions, the casing 62 swings around the pivot pin 72 in a clockwise direction to accommodate itself to these changing positions.

In raising the top structure, the operator energizes the motor 70 to operate in the reverse direction, rotating the screw shaft 61 in a clockwise direction, moving the nut 57 and tubular member 56 upward. This causes the links 51 to be moved upwardly about the pivots 41, causing the levers 47 to move in clockwise directions around the pivot pins 46, causing the links 42 to pivotally move in counterclockwise directions.

The upward motion of the links 51 acting through the links 49 and levers 42 causes the pillar extensions 19 to move upwardly and forwardly in a counter-clockwise direction. While this is going on, the levers 42 which are carried thereby move to ultimately position the ends of the frame members 27 in the sockets 26 of the extensions 19 just prior to the completion of the top raising action. The top covering 22 is thus drawn forward and is tightened when the forward bow 37 approaches its raised position. This moves the bows 21 and 23 to their raised positions (Figure 1) wherein they are held solely by the top cover 22. While the top is being raised in this manner, the springs 67, which were previously tensioned during the lowering operation of the top, now aid to raise the top.

The operation of the modifications shown in Figures 9 to 13 is similar to that of the principal form in Figures 1 to 8 inclusive. In each case the cross shaft 79, 89 or 98 transmits the motion from the power driven side of the top structure to the opposite side thereof, crossing the space behind the rear seat back 75. Thus the single motor 70 is caused to raise and lower the opposite sides of the top structure in accurate synchronism, avoiding the binding or jamming and consequent wear arising from tops wherein the opposite sides are out of synchronism. The motor 70 and its associated parts occupy an otherwise unused location and the cross shaft 79, 89 or 88 crosses the body at a location where it is out of sight and likewise removed from obstructing the passenger compartment.

While I have shown and described my invention in detail, it is to be understood that the same is to be limited only by the appended claims for many changes may be made without departing from the spirit and scope of the invention.

What I claim is:

1. In a foldable top structure for a vehicle body having a seat extending thereacross, a pair of levers pivoted on aligned fulcrums on opposite sides of said body rearwardly of said seat, a top bow and link assembly operatively connected to said levers, power operated top raising mechanism connected to said assembly, bent brackets fixedly mounted on said levers and having portions bent inwardly toward each other, said inwardly bent portions having shaft-receiving bores therein, and a cross shaft shorter than the distance between said fulcrums interconnecting said brackets and secured in said bores.

2. In a foldable top structure for a vehicle body having a seat extending thereacross, a pair of levers pivoted on aligned fulcrums on opposite sides of said body rearwardly of said seat, a top bow and link assembly operatively connected to said levers, power operated top raising mechanism connected to said assembly, bent brackets fixedly secured to said levers and having portions extending inwardly toward one another in opposite directions into alignment with said fulcrums but offset inwardly therefrom, and a cross shaft shorter than the distance between said fulcrums interconnecting said brackets.

3. In a foldable top structure for a vehicle body having a seat extending thereacross, a pair of levers pivoted on aligned fulcrums on opposite sides of said body rearwardly of said seat, a top bow and link assembly operatively connected to said levers, power operated top raising mechanism connected to said assembly, bent brackets fixedly secured to said levers at locations spaced away from said fulcrums and extending into alignment therewith, said brackets being offset inwardly of said fulcrums toward one another, and a cross shaft shorter than the distance between said fulcrums interconnecting said brackets at the portions thereof in alignment with said fulcrums.

4. In a foldable top structure for a vehicle body having a seat extending thereacross, a pair of levers pivoted on aligned fulcrums rearwardly of said seat, a top bow and link assembly operatively connected to said levers, power operated top raising mechanism connected to said assembly, brackets secured to said levers at locations spaced away from said fulcrums and extending into alignment therewith, said brackets being offset inwardly of said fulcrums toward one another and having bores aligned with said fulcrums, a tubular shaft shorter than the distance between said fulcrums mounted in said bores, and means for drivingly connecting said tubular shaft with said brackets.

5. In a foldable top structure for a vehicle body having a seat extending thereacross, a pair of levers pivoted on aligned fulcrums rearwardly of said seat, a top bow and link assembly operatively connected to said levers, power operated top raising mechanism connected to said assembly, brackets secured to said levers at locations spaced away from said fulcrums and extending into alignment therewith, said brackets being offset inwardly of said fulcrums toward one another and having bores aligned with said fulcrums, a tubular shaft shorter than the distance between said fulcrums mounted in said bores, and key members drivingly connecting said tubular shaft with said brackets.

6. In a foldable top structure for a vehicle body having a seat extending thereacross, a pair of levers pivoted on aligned fulcrums rearwardly of said seat, a top bow and link assembly operatively connected to said levers, power operated top raising mechanism connected to said assembly, brackets secured to said levers at locations spaced away from said fulcrums and extending into alignment therewith, said brackets being offset inwardly of said fulcrums toward one another and having bores aligned with said fulcrums, a tubular shaft shorter than the distance between said fulcrums mounted in said bores, and key members drivingly connecting said tubular shaft with said brackets, said key member being secured in recesses in said shaft and engaging adjacent recesses in said bracket bores.

7. In a foldable top structure for a vehicle body having a seat extending thereacross, a pair of levers pivoted on aligned fulcrums rearwardly of said seat, a top bow and link assembly operatively connected to said levers, power operated top raising mechanism connected to said assembly, brackets secured to said levers at locations spaced away from said fulcrums and extending into alignment therewith, said brackets being offset inwardly of said fulcrums toward one another and having bores aligned with said fulcrums, a solid shaft shorter than the distance between said fulcrums mounted in said bores, and means for drivingly connecting said solid shaft with said brackets.

8. In a foldable top structure for a vehicle body having a seat extending thereacross, a pair of levers pivoted on aligned fulcrums rearwardly of said seat, a top bow and link assembly operatively connected to said levers, power operated top raising mechanism connected to said assembly, approximately U-shaped brackets secured to said levers on opposite sides of said fulcrums and extending thereacross and having bores aligned with said fulcrums, a shaft mounted in said bores, and means for drivingly connecting said shaft with said brackets.

FREDERICK J. WESTROPE.